United States Patent
Schmaler et al.

(10) Patent No.: US 12,112,437 B2
(45) Date of Patent: Oct. 8, 2024

(54) POSITIONING MEDICAL VIEWS IN AUGMENTED REALITY

(71) Applicant: Brainlab AG, Munich (DE)

(72) Inventors: Christian Schmaler, Munich (DE); Juliane Weinzierl, Munich (DE); Oliver Fleig, Baldham (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 17/793,225

(22) PCT Filed: Jan. 28, 2021

(86) PCT No.: PCT/EP2021/051952
§ 371 (c)(1),
(2) Date: Jul. 15, 2022

(87) PCT Pub. No.: WO2022/161610
PCT Pub. Date: Aug. 4, 2022

(65) Prior Publication Data
US 2023/0360334 A1    Nov. 9, 2023

(51) Int. Cl.
*G06T 19/00* (2011.01)
*G06T 11/00* (2006.01)
*G06V 10/24* (2022.01)

(52) U.S. Cl.
CPC .......... *G06T 19/006* (2013.01); *G06T 11/008* (2013.01); *G06V 10/24* (2022.01)

(58) Field of Classification Search
None
See application file for complete search history.

(56) References Cited

U.S. PATENT DOCUMENTS

| | | | |
|---|---|---|---|
| 2014/0081659 A1* | 3/2014 | Nawana | A61B 5/4509 705/3 |
| 2018/0303558 A1 | 10/2018 | Thomas | |
| 2018/0310907 A1* | 11/2018 | Zhang | G06F 3/0346 |
| 2019/0053851 A1 | 2/2019 | Siemionow et al. | |
| 2019/0357982 A1* | 11/2019 | Flossmann | A61B 34/25 |
| 2019/0378276 A1 | 12/2019 | Flossmann et al. | |
| 2020/0188028 A1 | 6/2020 | Feiner et al. | |
| 2020/0322582 A1* | 10/2020 | Park | A61B 90/13 |
| 2020/0375666 A1 | 12/2020 | Murphy | |

(Continued)

FOREIGN PATENT DOCUMENTS

WO    WO-2020123671 A1 *    6/2020    ............. A61B 34/10

OTHER PUBLICATIONS

International Search Report and Written Opinion issued for Application No. PCT/EP2021/051952, 14 pages, dated Sep. 29, 2021.

(Continued)

*Primary Examiner* — Yingchun He
(74) *Attorney, Agent, or Firm* — Gray Ice Higdon (57) ABSTRACT

The present invention relates to a computer-implemented medical method, a computer program and a system for determining a reconstructed image augmentation of a field of view provided by an augmented reality device (3), wherein an image location and/or at least one image orientation of at least one two-dimensional reconstructed image (9, 10 10) within the field view depends on the spatial position of at least one object (8, 11, 12).

15 Claims, 5 Drawing Sheets

(56) References Cited

U.S. PATENT DOCUMENTS

2022/0133284 A1* 5/2022 Lampotang ............ A61B 34/20
600/562

OTHER PUBLICATIONS

Salah et al., "An Approach for Enhanced Slice Visualization Utilizing Augmented Reality: Algorithm and Applications" Research Gate. 7 pages, dated Dec. 2010. Retrieved from https://www.researchgate.net/publication/267769669.

* cited by examiner

POSITIONING MEDICAL VIEWS IN AUGMENTED REALITY

FIELD OF THE INVENTION

The present invention relates to a computer-implemented method for determining a reconstructed image augmentation in a field of view provided by an augmented reality device, a corresponding computer program, a computer-readable storage medium storing such a program and a computer executing the program, as well as a medical system comprising an electronic data storage device and the aforementioned computer.

TECHNICAL BACKGROUND

In recent years mixed reality which is also referred to herein as augmented reality has become more and more important in the medical field. In particular, additional information is projected into the field of view of medical personnel to assist in carrying out procedures on the patient or for planning such procedures. This may include overlaying virtual object information in a correct alignment with the physical world as it is perceived by a human being. Provided that the virtual overlay is correctly aligned with the physical world within an operator's field of view, virtual and physical objects appear as being fused together. For some applications it is however desirable to provide information, for example virtual screens within the field of view, which is not brought into alignment with real world objects.

The present invention has the object of improving the approach of providing a virtual overlay within a user's field of view in terms of ergonomics. For example, it is desirable to position a virtual overlay within the field of view such that it is easily recognized by a user, without cluttering that field of view or even obstructing a region of interest of the real world by the virtual overlay. Moreover, it is an object of the present invention to improve the perception of additional information provided by the virtual overlay, for example in order to improve hand-eye-coordination when operating medical instruments or devices which have a virtual counterpart shown in the virtual overlay.

The present invention can be used for any medical procedures that involve assistance provided by an augmentation of the field of view of medical personnel e.g. in connection with a system for image-guided surgery such as Curve® and Kick®, both products of Brainlab AG and/or augmented reality devices such as Magic Leap One®, a product of Magic Leap Inc.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

In the following, a short description of the specific features of the present invention is given which shall not be understood to limit the invention only to the features or a combination of the features described in this section.

The disclosed method encompasses determining a reconstructed image augmentation of a field of view provided by an augmented reality device, wherein an image location and/or at least one image orientation of at least one two-dimensional reconstructed image within the field view depends on the spatial position of at least one object, particularly on the relative spatial position of the augmented reality device and the at least one object.

GENERAL DESCRIPTION OF THE INVENTION

In this section, a description of the general features of the present invention is given for example by referring to possible embodiments of the invention.

In general, the invention reaches the aforementioned object by providing, in a first aspect, a computer-implemented medical method of determining a reconstructed image augmentation in a field of view provided by an augmented reality device. The method comprises executing, on at least one processor of at least one computer (for example at least one computer being part of a navigation system), the following exemplary steps which are executed by the at least one processor.

In a (for example first) exemplary step, 3D-image data is acquired which describes at least one three-dimensional image dataset of a patient's body part.

In a (for example second) exemplary step, reconstructed image data is determined based on the 3D-image data, which describes at least one two-dimensional reconstructed image.

In a (for example third) exemplary step, object position data is acquired which describes a spatial position of at least one object and a spatial position of the augmented reality device.

In a (for example fourth) exemplary step, image augmentation data is determined based on the reconstructed image data and the object position data, which describes the at least one two-dimensional reconstructed image within the field of view provided by the augmented reality device, wherein an image location and/or at least one image orientation of the at least one two-dimensional reconstructed image depends on the spatial position of the at least one object.

In other words, it is the aim of the present invention to display one or more images that have been calculated/reconstructed from a three-dimensional image dataset of a patient within the field of view provided to the user, wherein the spatial location and/or the spatial orientation of these images depends on the spatial location and/or the spatial orientation of at least one object, particularly the spatial position of the at least one object with respect to the augmented reality device or the line of sight thereof.

By doing so, it is not only possible to provide the reconstructed images at a location at which they do not obstruct important areas and objects of the real world which need to be seen by the user, but also to provide those images at a predictable location and/or orientation with respect to the real world. Further, the present invention provides an augmented reality display which is improved in terms of ergonomics, particularly by facilitating hand-eye-coordination when objects or devices or parts thereof which are manipulated by the user are seen in reality as well as in the virtual overlay, i.e. the at least one reconstructed image.

In an example of the method according to the first aspect, acquiring 3D-image data involves generating the three-dimensional image dataset of the patient's body part with an imaging modality, or acquiring the three-dimensional image dataset of the patient's body part that was generated using an imaging modality, wherein this imaging modality is selected from the group consisting of:
  a CT imaging modality;
  an MRI imaging modality;
  an ultrasound imaging modality.

Thus, the reconstructed images can be calculated from a three-dimensional dataset acquired by any desired imaging modality. Further, the reconstructed images may include image information that was composed from image information acquired by a plurality of imaging modalities, particularly from two or more of the aforementioned imaging modalities.

Further, the image datasets acquired by one or more of those imaging modalities may be registered to and supplemented with artificial image data which is particularly retrieved from an anatomical atlas. For example, anatomical structures of interest or parts thereof shown in the image(s) can then be easily identified and highlighted in the reconstructed images shown to the user in the virtual overlay.

In a more specific example, the reconstructed image data is acquired with the help of a device which is movable relative to the patient's body part and has a device body that defines a device location and at least one device orientation, wherein a location of the at least one reconstructed image relative to a three-dimensional image representation of the patient's body part is determined based on the device location relative to the patient's body part, particularly wherein a position vector of an image plane of the at least one reconstructed image in a coordinate system assigned to the image dataset is based on the device location, and/or wherein at least one orientation of the at least one reconstructed image relative to a three-dimensional image representation of the patient's body part is determined based on the at least one device orientation relative to the patient's body part, particularly wherein at least one direction vector of an image plane of the at least one reconstructed image in a coordinate system assigned to the image dataset is based on the at least one device orientation, and/or wherein at least one orientation of the at least one reconstructed image relative to a three-dimensional image representation of the patient's body part is determined based on at least one anatomical direction of the patient, particularly a medial-lateral direction, a cranial-caudal direction and/or an anterior-posterior direction.

In general, the one or more reconstructed images may represent a two-dimensional "slice" of a three-dimensional virtual image representation of the patient's anatomy, wherein the location as well as the orientation of such slice with respect to the three-dimensional image representation is selected with the help of a device or instrument that can be manipulated by the user, for example a hand-held pointer instrument or a surgical tool or instrument. For example, the three-dimensional image representation of the patient's body part may be registered with the actual patient's anatomy, such that the one or more images or slices to be shown later on in the virtual overlay are selected by manipulating, i.e. moving the real medical instrument with respect to the real patient. Additionally or alternatively, the orientation of one or more of these selected images relative to the three-dimensional representation may depend on directions defined by the patient's anatomy, i.e. one or more anatomical directions.

Further, the location and/or the orientation of the selected reconstructed images with respect to the three-dimensional image representation may be defined as follows: The location of the image plane with respect to the three-dimensional image representation may be defined by a position vector extending from the point of origin of a coordinate system assigned to the three-dimensional image representation. Further, the orientation of the image plane may be defined by two direction vectors orthogonally oriented with respect to each other, wherein at least one direction vector may be defined as being oriented in a longitudinal axis of the movable device, and/or wherein at least one direction vector is defined as being parallel to an anatomical direction, or oriented in a vertical or horizontal direction defined within the coordinate system assigned to the three-dimensional image representation.

For determining the spatial position of the at least one object, particularly the relative position of the at least one object and the augmented reality device, the inventive approach may utilize an external medical tracking system adapted to track the spatial position of the at least one object and of the augmented reality device within a static coordinate system, which is particularly assigned to an operating theater; and/or a tracking system which is in particular integrated into the augmented reality device, and which is adapted to track the spatial position of the at least one object with respect to the spatial position of the augmented reality device and within a coordinate system coupled to the augmented reality device.

In this regard, any medical tracking system adapted to recognize tracking markers by optical, electromagnetic or ultrasound functional principles may be used. Further, it is also conceivable to determine the position, particularly the relative position of the one or more objects with respect to the augmented reality device based on an analysis of images acquired by one or more cameras that may be statically disposed within an operating theater, or which may be coupled to or integrated in the augmented reality device and may therefore be moved within an operating theater together with the augmented reality device.

In a further example of the inventive approach, each one of the following examples may be considered as the at least one object:

one or more sections of an at least temporarily static installation of an operating theater, particularly including a wall, a ceiling, a floor, furnishings and fixtures thereof;

one or more sections of a medical device or instrument, particularly a hand-guided medical device or instrument, specifically the movable device that is used to define the location and/or the orientation of the at least one reconstructed image selection with respect to the three-dimensional image representation as explained above;

one or more sections of a medical device or medical apparatus, which is particularly movable, specifically motorized;

one or more sections of the patient's anatomy including one or more anatomical directions.

Further, the at least one reconstructed image, i.e. the location and/or the orientation thereof may be aligned within the field of view provided by the augmented reality device, such that the at least one two-dimensional reconstructed image is positioned at a predefined distance and/or in a predefined direction with respect to the at least one object, particularly at a position in which the image and the object do not occlude each other within the field of view. Additionally or alternatively, the at least one image is positioned to show a representation of a structure at an offset position with respect to the corresponding actual structure in a predefined direction, particularly in a medial-lateral direction, a cranial-caudal direction and/or an anterior-posterior direction of the patient. Further, the at least one image may have an image plane with at least one direction vector oriented dependent upon, particularly oriented in or perpendicularly to, an anatomical direction of the patient, particularly to a medial-lateral direction, a cranial-caudal direction and/or an anterior-posterior direction. Further, the at least one image may have an image plane with at least one direction vector oriented dependent upon, particularly oriented in or perpendicularly to, a spatial direction of a static coordinate system, particularly to a gravity vector, a vertical direction and/or a horizontal direction of a coordinate system assigned to an operating theater. Further, the at least one image may have an image plane with at least one direction vector oriented dependent upon, particularly oriented in or perpendicularly to, a spatial direction defined by a body of an instrument or a device, particularly to a longitudinal axis of a medical instrument.

The at least one image may be positioned within the field of view close to an object such that a user does not need to look away from the object to retrieve information from the image, but without the image obstructing the user's view onto the object. Further, the one or more images may be positioned such that the relative position between the real world and the representation thereof as shown in the image (s) coincides in one or more, preferably in two dimensions within the field of view. In other words, the image is not a mere overlay registered to the real world, but is rather shifted with respect to the real world in one or two dimensions. This improves the field of view as real world objects are not obstructed by their representation provided in the images. Further, the at least one image, particularly the plane of the image as it appears to the user may be oriented within the field of view such that at least one direction vector thereof is oriented in or perpendicularly to a spatial direction defined with respect to the real world, for example with respect to the patient's anatomy and/or with respect to a real world coordinate system. For example, those spatial directions may include a medial-lateral direction, a cranial-caudal direction, an anterior-posterior direction, a horizontal direction or a vertical direction which is oriented parallel to a gravity vector. More specifically, an image may be oriented such that one direction vector thereof is oriented in parallel to a medial-lateral or a cranial-caudal direction assigned to the patient's real anatomy, wherein the other direction vector is oriented parallel or perpendicularly to a gravity vector or to a vertical direction of a static coordinate system assigned to the operating theater.

Moreover, an image may be positioned and/or oriented depending on the spatial location and/or orientation of a plurality of objects. In a specific example, a first direction vector of the image may be oriented in an anatomical direction of the patient's real world anatomy, wherein the other direction vector is oriented parallel to a longitudinal axis of a real world instrument.

Of course, it is conceivable that any of the above examples for positioning the one or more images within the field of view depending on one or more objects can be combined in any feasible manner. Further, this real world augmentation may be provided and updated in real time, such that the images "move" within the field of view along with real world objects, resulting in the impression of a viewer that the images adhere to real world objects.

In a further example of the method according to the first aspect, the location and/or orientation of a plurality of images projected into the field of view may also depend from each other. For example the image planes of two or more images can be oriented perpendicularly to each other.

In a further example, one or more of the images can be limited to a virtual image frame such that the image projection within the field of view can be confined to a necessary minimum and does therefore not obstruct the view on real world objects.

In a further example, the position and/or orientation of at least one of the reconstructed images projected into the user's field of view may also depend on the user's line of sight on the real world and the images projected into the field of view. For example, if the viewing angle between the user's line of sight and the image plane of one or more images falls under a predefined threshold, for example under 45°, the corresponding image may be rotated, for example around a direction vector thereof and/or by a predefined amount, for example by 90°, so as to increase the viewing angle again. In a further example, the viewing angle between the user's line of sight and the image plane may be constantly maintained at a predefined value, e.g. at 90° by rotating the image around one or both of its direction vectors.

Further, one or more of the images projected into the user's field of view may be positioned with respect to a correspondingly real world object such that the image is always present next to the object without obstructing the view on the object even when the line of sight is altered, for example when the user "moves around" or "looks around" the object.

In a second aspect, the invention is directed to a computer program comprising instructions which, when the program is executed by at least one computer, causes the at least one computer to carry out method according to the first aspect. The invention may alternatively or additionally relate to a (physical, for example electrical, for example technically generated) signal wave, for example a digital signal wave, such as an electromagnetic carrier wave carrying information which represents the program, for example the aforementioned program, which for example comprises code means which are adapted to perform any or all of the steps of the method according to the first aspect. The signal wave is in one example a data carrier signal carrying the aforementioned computer program. A computer program stored on a disc is a data file, and when the file is read out and transmitted it becomes a data stream for example in the form of a (physical, for example electrical, for example technically generated) signal. The signal can be implemented as the signal wave, for example as the electromagnetic carrier wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representative of the aforementioned program, i.e. comprising the program.

In a third aspect, the invention is directed to a computer-readable storage medium on which the program according to the second aspect is stored. The program storage medium is for example non-transitory.

In a fourth aspect, the invention is directed to at least one computer (for example, a computer), comprising at least one processor (for example, a processor), wherein the program according to the second aspect is executed by the processor, or wherein the at least one computer comprises the computer-readable storage medium according to the third aspect.

In a fifth aspect, the invention is directed to a medical system, comprising:
a) the at least one computer according to the fourth aspect;
b) at least one electronic data storage device storing at least the 3D-image data; and c) an augmented reality device for assisting in carrying out a medical procedure on the patient,
   wherein the at least one computer is operably coupled to
   the at least one electronic data storage device for acquiring, from the at least one data storage device, at least the 3D-image data, and
   the augmented reality device for issuing a control signal to the augmented reality device for controlling the operation of the augmented reality device on the basis of the image augmentation data.

Alternatively or additionally, the invention according to the fifth aspect is directed to a for example non-transitory computer-readable program storage medium storing a program for causing the computer according to the fourth aspect to execute the data processing steps of the method according to the first aspect.

For example, the invention does not involve or in particular comprise or encompass an invasive step which would represent a substantial physical interference with the body requiring professional medical expertise to be carried out and entailing a substantial health risk even when carried out with the required professional care and expertise.

The present invention also relates to the use of the device/system or any embodiment thereof for conducting or planning a medical procedure. The use comprises for example at least one of the steps of the method according to any embodiment as described herein.

Definitions

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein. The signal wave is in one example a data carrier signal carrying the aforementioned computer program. The invention also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

The n-dimensional image of a body is registered when the spatial location of each point of an actual object within a space, for example a body part in an operating theatre, is assigned an image data point of an image (CT, MR, etc.) stored in a navigation system.

Image registration is the process of transforming different sets of data into one coordinate system. The data can be multiple photographs and/or data from different sensors, different times or different viewpoints. It is used in computer vision, medical imaging and in compiling and analyzing images and data from satellites. Registration is necessary in order to be able to compare or integrate the data obtained from these different measurements.

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object.

Determining this relative position is also referred to as registering the marker device and the object. The marker device or the object can be tracked, which means that the position of the marker device or the object is ascertained twice or more over time.

A marker holder is understood to mean an attaching device for an individual marker which serves to attach the marker to an instrument, a part of the body and/or a holding element of a reference star, wherein it can be attached such that it is stationary and advantageously such that it can be detached. A marker holder can for example be rod-shaped and/or cylindrical. A fastening device (such as for instance a latching mechanism) for the marker device can be provided at the end of the marker holder facing the marker and assists in placing the marker device on the marker holder in a force fit and/or positive fit.

A pointer is a rod which comprises one or more—advantageously, two—markers fastened to it and which can be used to measure off individual coordinates, for example spatial coordinates (i.e. three-dimensional coordinates), on a part of the body, wherein a user guides the pointer (for example, a part of the pointer which has a defined and advantageously fixed position with respect to the at least one marker attached to the pointer) to the position corresponding to the coordinates, such that the position of the pointer can be determined by using a surgical navigation system to detect the marker on the pointer. The relative location between the markers of the pointer and the part of the pointer used to measure off coordinates (for example, the tip of the pointer) is for example known. The surgical navigation system then enables the location (of the three-dimensional coordinates) to be assigned to a predetermined body structure, wherein the assignment can be made automatically or by user intervention.

A "reference star" refers to a device with a number of markers, advantageously three markers, attached to it, wherein the markers are (for example detachably) attached to the reference star such that they are stationary, thus providing a known (and advantageously fixed) position of the markers relative to each other. The position of the markers relative to each other can be individually different for each reference star used within the framework of a surgical navigation method, in order to enable a surgical navigation system to identify the corresponding reference star on the basis of the position of its markers relative to each other. It is therefore also then possible for the objects (for example, instruments and/or parts of a body) to which the reference star is attached to be identified and/or differentiated accordingly. In a surgical navigation method, the reference star serves to attach a plurality of markers to an object (for example, a bone or a medical instrument) in order to be able to detect the position of the object (i.e. its spatial location and/or alignment). Such a reference star for example features a way of being attached to the object (for example, a clamp and/or a thread) and/or a holding element which ensures a distance between the markers and the object (for example in order to assist the visibility of the markers to a marker detection device) and/or marker holders which are mechanically connected to the holding element and which the markers can be attached to.

The present invention is also directed to a navigation system for computer-assisted surgery. This navigation system preferably comprises the aforementioned computer for processing the data provided in accordance with the computer implemented method as described in any one of the embodiments described herein. The navigation system preferably comprises a detection device for detecting the position of detection points which represent the main points and auxiliary points, in order to generate detection signals and to supply the generated detection signals to the computer, such that the computer can determine the absolute main point data and absolute auxiliary point data on the basis of the detection signals received. A detection point is for example a point on the surface of the anatomical structure which is detected, for example by a pointer. In this way, the absolute point data can be provided to the computer. The navigation system also preferably comprises a user interface for receiving the calculation results from the computer (for example, the position of the main plane, the position of the auxiliary plane and/or the position of the standard plane). The user interface provides the received data to the user as information. Examples of a user interface include a display device such as a monitor, or a loudspeaker. The user interface can use any kind of indication signal (for example a visual signal, an audio signal and/or a vibration signal). One example of a display device is an augmented reality device (also referred to as augmented reality glasses) which can be used as so-called "goggles" for navigating. A specific example of such augmented reality glasses is Google Glass (a trademark of Google, Inc.). An augmented reality device can be used both to input information into the computer of the navigation system by user interaction and to display information outputted by the computer.

The invention also relates to a navigation system for computer-assisted surgery, comprising:
- a computer for processing the absolute point data and the relative point data;
- a detection device for detecting the position of the main and auxiliary points in order to generate the absolute point data and to supply the absolute point data to the computer;
- a data interface for receiving the relative point data and for supplying the relative point data to the computer; and
- a user interface for receiving data from the computer in order to provide information to the user, wherein the received data are generated by the computer on the basis of the results of the processing performed by the computer.

A navigation system, such as a surgical navigation system, is understood to mean a system which can comprise: at least one marker device; a transmitter which emits electromagnetic waves and/or radiation and/or ultrasound waves; a receiver which receives electromagnetic waves and/or radiation and/or ultrasound waves; and an electronic data processing device which is connected to the receiver and/or the transmitter, wherein the data processing device (for example, a computer) for example comprises a processor (CPU) and a working memory and advantageously an indicating device for issuing an indication signal (for example, a visual indicating device such as a monitor and/or an audio indicating device such as a loudspeaker and/or a tactile indicating device such as a vibrator) and a permanent data memory, wherein the data processing device processes navigation data forwarded to it by the receiver and can advantageously output guidance information to a user via the indicating device. The navigation data can be stored in the permanent data memory and for example compared with data stored in said memory beforehand.

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The atlas data comprises image information (for example, positional image information) which can be matched (for example by applying an elastic or rigid image fusion algorithm) for example to image information (for example, positional image information) contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

For example, the atlas data includes information of the anatomical body part. This information is for example at least one of patient-specific, non-patient-specific, indication-specific or non-indication-specific. The atlas data therefore describes for example at least one of a patient-specific, non-patient-specific, indication-specific or non-indication-specific atlas. For example, the atlas data includes movement information indicating a degree of freedom of movement of the anatomical body part with respect to a given reference (e.g. another anatomical body part). For example, the atlas is a multimodal atlas which defines atlas information for a plurality of (i.e. at least two) imaging modalities and contains a mapping between the atlas information in different imaging modalities (for example, a mapping between all of the modalities) so that the atlas can be used for transforming medical image information from its image depiction in a first imaging modality into its image depiction in a second imaging modality which is different from the first imaging modality or to compare (for example, match or register) images of different imaging modality with one another.

The movements of the treatment body parts are for example due to movements which are referred to in the following as "vital movements". Reference is also made in this respect to EP 2 189 943 A1 and EP 2 189 940 A1, also published as US 2010/0125195 A1 and US 2010/0160836 A1, respectively, which discuss these vital movements in detail. In order to determine the position of the treatment body parts, analytical devices such as x-ray devices, CT devices or MRT devices are used to generate analytical images (such as x-ray images or MRT images) of the body. For example, analytical devices are constituted to perform medical imaging methods. Analytical devices for example use medical imaging methods and are for example devices for analyzing a patient's body, for instance by using waves and/or radiation and/or energy beams, for example electromagnetic waves and/or radiation, ultrasound waves and/or particles beams. Analytical devices are for example devices which generate images (for example, two-dimensional or three-dimensional images) of the patient's body (and for example of internal structures and/or anatomical parts of the patient's body) by analyzing the body. Analytical devices are for example used in medical diagnosis, for example in radiology. However, it can be difficult to identify the treatment body part within the analytical image. It can for example be easier to identify an indicator body part which correlates with changes in the position of the treatment body part and for example the movement of the treatment body part. Tracking an indicator body part thus allows a movement of the treatment body part to be tracked on the basis of a known correlation between the changes in the position (for example the movements) of the indicator body part and the changes in the position (for example the movements) of the treatment body part. As an alternative to or in addition to tracking indicator body parts, marker devices (which can be used as an indicator and thus referred to as "marker indicators") can be tracked using marker detection devices. The position of the marker indicators has a known (predetermined) correlation with (for example, a fixed relative position relative to) the position of indicator structures (such as the thoracic wall, for example true ribs or false ribs, or the diaphragm or intestinal walls, etc.) which for example change their position due to vital movements.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT), as mentioned by Wikipedia.

The image data thus generated is also termed "medical imaging data". Analytical devices for example are used to generate the image data in apparatus-based imaging methods. The imaging methods are for example used for medical diagnostics, to analyze the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumor represents an example of a change in an anatomical structure. If the tumor grows, it may then be said to represent an expanded anatomical structure. This expanded anatomical structure may not be detectable; for example, only a part of the expanded anatomical structure may be detectable. Primary/high-grade brain tumors are for example usually visible on MRI scans when contrast agents are used to infiltrate the tumor. MRI scans represent an example of an imaging method. In the case of MRI scans of such brain tumors, the signal enhancement in the MRI images (due to the contrast agents infiltrating the tumor) is considered to represent the solid tumor mass. Thus, the tumor is detectable and for example discernible in the image generated by the imaging method. In addition to these tumors, referred to as "enhancing" tumors, it is thought that approximately 10% of brain tumors are not discernible on a scan and are for example not visible to a user looking at the images generated by the imaging method.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
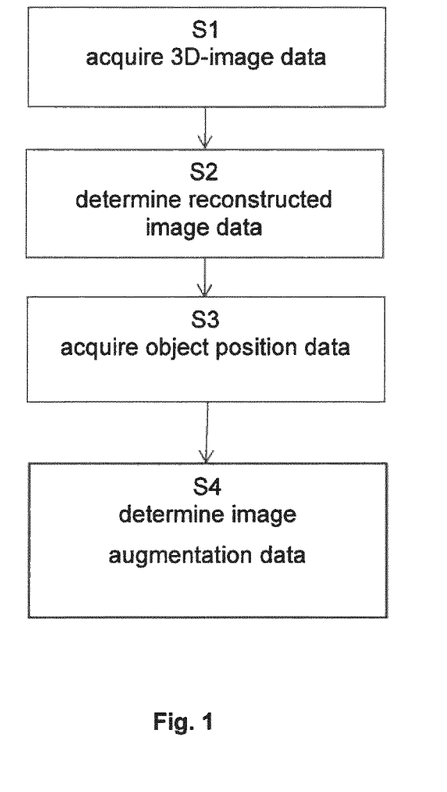
FIG. 1 illustrates the basic steps of the method according to the first aspect.

FIG. 1 illustrates the basic steps of the method according to the first aspect, in which step S1 encompasses acquiring 3D-image data, step S2 encompasses determining reconstructed image data based on the acquired 3D-image data, step S3 encompasses acquiring object position data and subsequent step S4 encompasses determining image augmentation data based on the reconstructed image data and the object position data.

Figure 2:
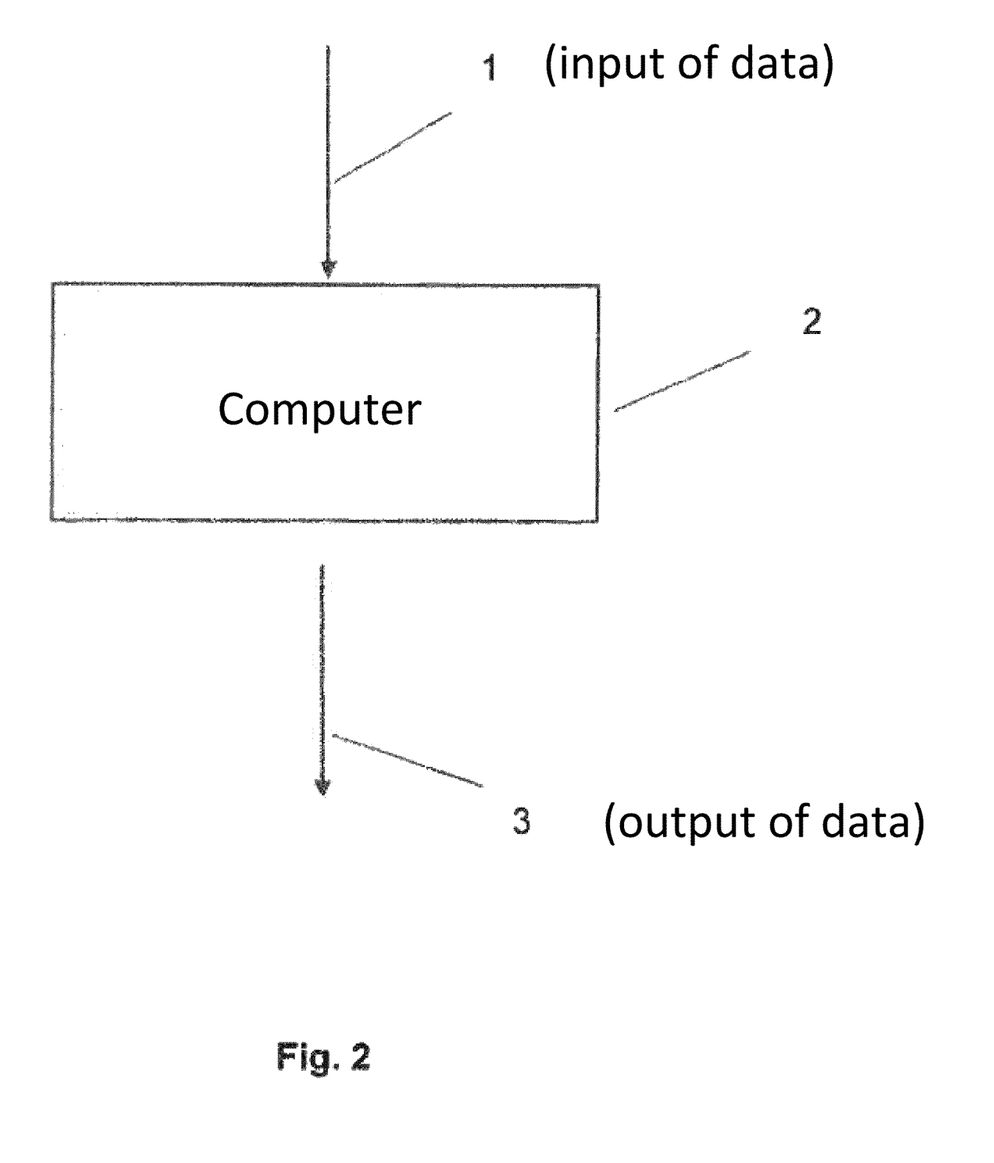
FIG. 2 shows an embodiment of the present invention, specifically the method according to the first aspect.

FIG. 2 illustrates an embodiment of the present invention that includes all essential features of the invention. In this embodiment, the entire data processing which is part of the method according to the first aspect is performed by a computer 2. Reference sign 1 denotes the input of data acquired by the method according to the first aspect into the computer 2 and reference sign 3 denotes the output of data determined by the method according to the first aspect.

Figure 3:
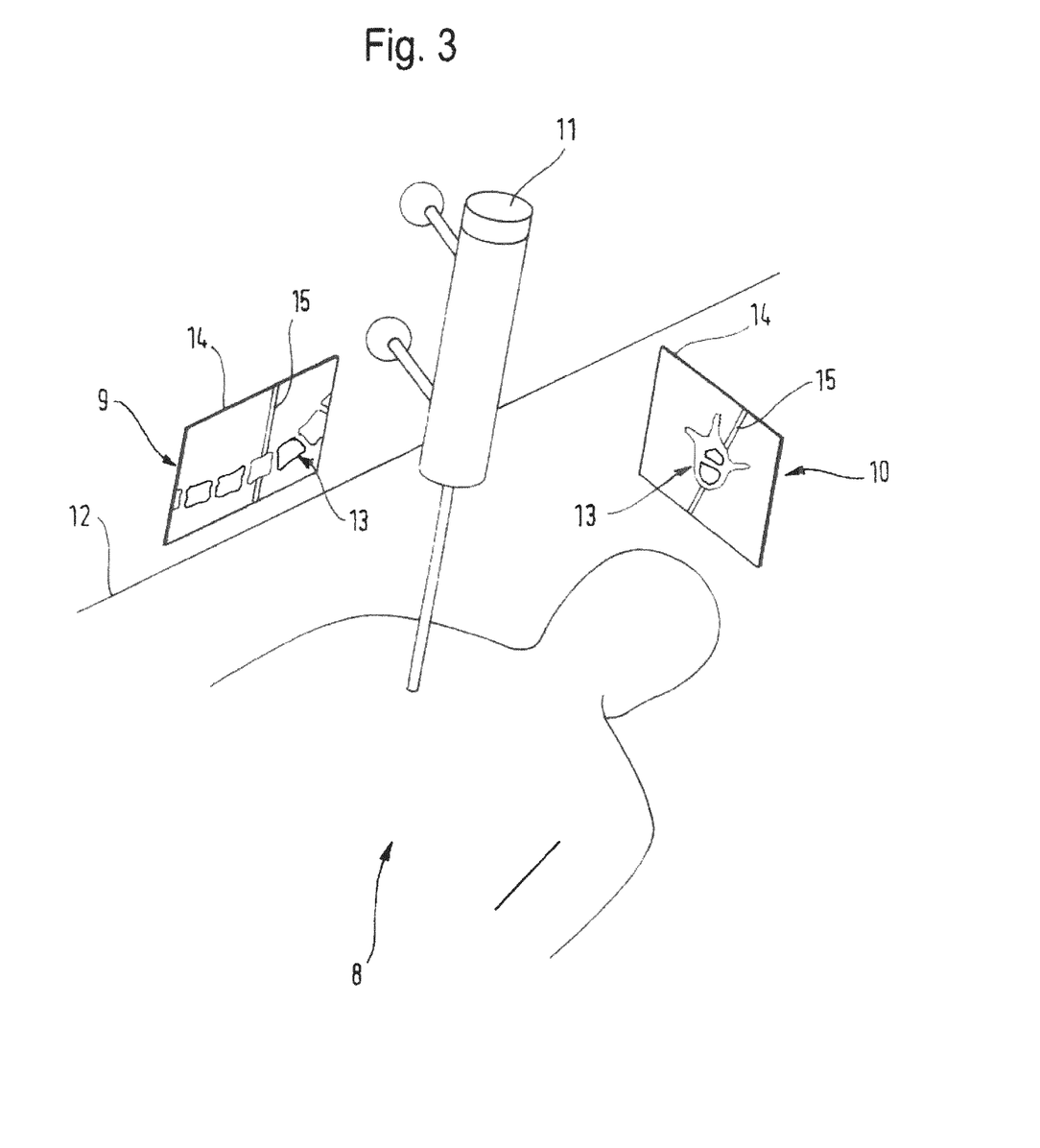
FIG. 3 shows a first example of an augmented field of view.

FIG. 3 shows an example for an augmented field of view provided by an augmented reality device 7 (cf. FIG. 5), for example AR-spectacles or AR-goggles. In the shown example, a surgeon wearing AR-goggles 7 is looking at a patient 8 lying in a prone position on a patient couch 12 while operating a hand-held pointer instrument 11 which is tracked in space by a medical tracking system. The spatial position of instrument 11 can therefore be calculated with respect to the patient's anatomy 8 in a manner known in the art. In the shown example, pointer instrument 11 is directed towards the patient's spine, with the longitudinal axis of pointer instrument 11 passing through the spine.

In addition to the real world objects, including patient 8, pointer instrument 11 and patient couch 12, virtual images 9 and 10 are projected into the field of view so as to provide the surgeon with additional image information concerning the patient's anatomy. In the shown example, images 9 and 10 show reconstructed inline views which are calculated from a three-dimensional CT-image dataset registered to the patient's anatomy 8.

The content of the reconstructed images 9 and 10 depends on the spatial position of the pointer instrument 11 with respect to the patient anatomy 8 and the CT dataset registered thereto, such that the reconstructed images 9 and 10 always include, and therefore show the trajectory 15 of pointer instrument 11.

The location and orientation of the images 9 and 10 projected into the field of view is also defined based on the spatial position of pointer instrument 11. As can be seen in FIG. 3, images 9 and 10 are positioned to the left and to the right of pointer instrument 11, respectively, having a predefined distance thereto. Further, images 9 and 10 are oriented to have a first direction vector oriented parallel to the cranial-caudal direction (image 9) and parallel to the medial-lateral direction (image 10), respectively. In additional thereto, both of these direction vectors may also be oriented horizontally within a coordinate system assigned to the operating theater including patient couch 12. The second direction vector of images 9 and 10 is oriented parallel to a corresponding component of the longitudinal axis of pointer instrument 11. In particular, the second direction vector of image 9 extends parallel to the pointer instrument's 11 longitudinal axis component within a plane perpendicular to the first direction vector. In a corresponding manner, the same applies to the second direction vector of image 10. Thus, images 9 and 10 are rotated around their first direction vector simultaneously to the orientation of pointer instrument 11 and its longitudinal axis. As is also shown in FIG. 3, images 9 and 10 are both confined to a rectangular frame 14.

Figure 4:
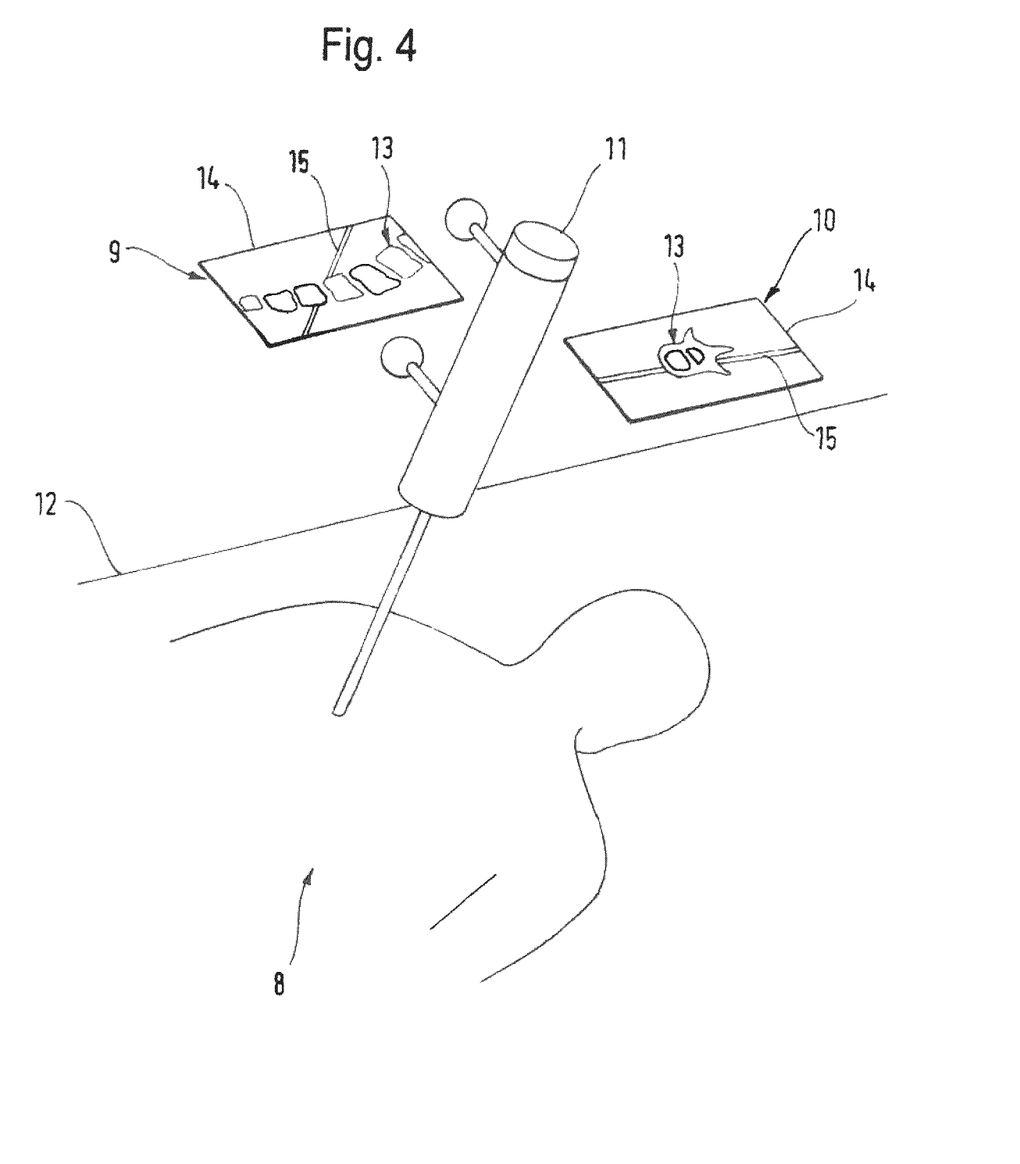
FIG. 4 shows a second example of an augmented field of view.

FIG. 4 shows an example of an augmented field of view which differs from the one shown in FIG. 3 in that the reconstructed images 9 and 10 are oriented within the field of view to have a horizontal image plane, i.e. with both direction vectors extending in horizontal directions horizontally. While the exemplary presentation shown in FIG. 4 may be considered independent from the exemplary presentation shown in FIG. 3, it is conceivable that the presentation shown in FIG. 3 may be replaced by the one shown in FIG. 4 as soon as the viewing angle on images 9 and 10 falls under a predefined threshold, for example when the user is looking at instrument 11 from above, i.e. onto the distal end of instrument 11. In such case, images 9 and 10 may "flip over" and appear as shown in FIG. 4.

The position and orientation of images 9 and 10 may depend on the spatial position of any real world object, for example one or more of the images 9 and 10 may be projected into the field of view to appear as a "picture" on the wall of the operating theater. Depending on the relative position of the user and the patient 8 or the direction in which the user is looking at patient 8, this "picture" may always appear on a wall of the operating theater which lies behind the patient. In such cases, it may be necessary to mirror the content of the corresponding image 9 or 10 such that it matches with the orientation of the patient's real anatomy 8.

Figure 5:
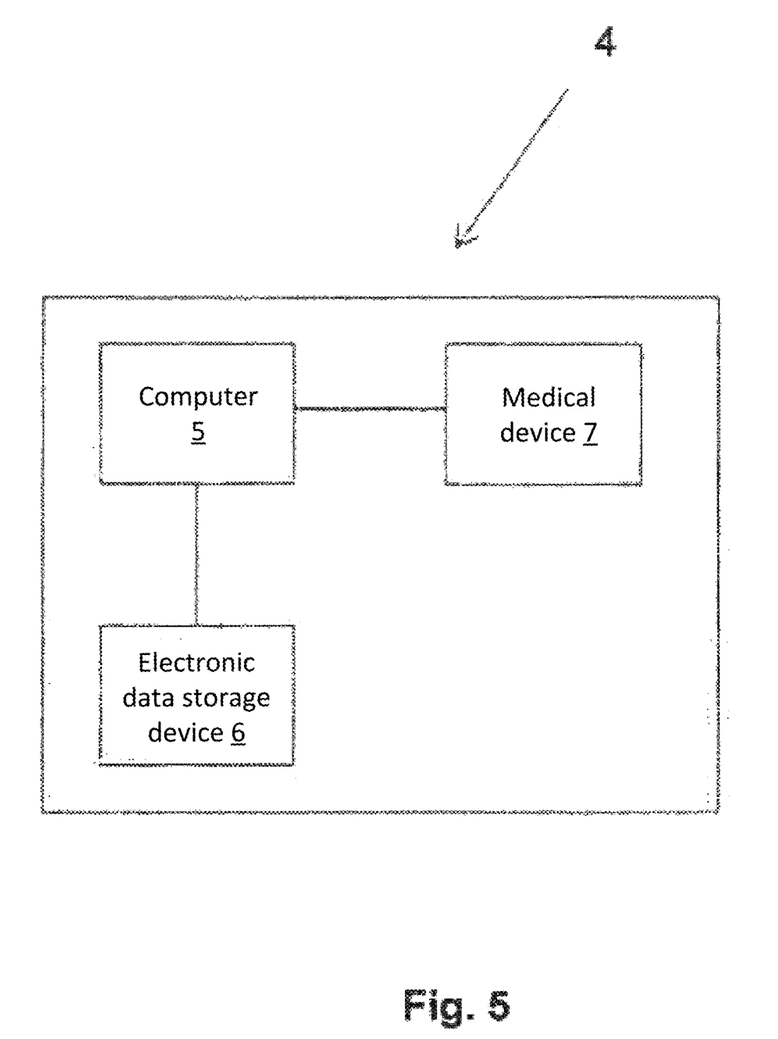
FIG. 5 is a schematic illustration of the system according to the fifth aspect.

FIG. 5 is a schematic illustration of the medical system 4 according to the fifth aspect. The system is in its entirety identified by reference sign 4 and comprises a computer 5, an electronic data storage device (such as a hard disc) 6 for storing at least the patient data and a medical device 7 (such as a radiation treatment apparatus). The components of the medical system 4 have the functionalities and properties explained above with regard to the fifth aspect of this disclosure.

The invention claimed is:

1. A computer-implemented method of determining a reconstructed image augmentation of a field of view provided by an augmented reality device, the method comprising:
   acquiring 3D-image data which describes at least one three-dimensional image representation of a patient's body part;
   acquiring object position data which describes a spatial position of the augmented reality device and a spatial position of at least one object including a device or instrument present within the field of view of the augmented reality device with respect to the patient's body part;
   determining reconstructed image data based at least on the 3D-image data, which describes at least one two-dimensional reconstructed image calculated from the three-dimensional image representation, wherein a location of the at least one two-dimensional reconstructed image relative to the three-dimensional image representation is determined based on the spatial position of the device or instrument relative to the patient's body part;
   determining image augmentation data based on the reconstructed image data and the object position data, which describes the at least one two-dimensional reconstructed image displayed within the field of view provided by the augmented reality device, wherein an image location and/or at least one image orientation of the at least one displayed two-dimensional reconstructed image is defined with respect to the spatial position of the at least one object being selected from a group consisting of:
      one or more sections of an at least temporarily static installation of an operating theatre,
      one or more sections of a medical device or instrument, and
      one or more sections of a patient's anatomy including one or more anatomical directions.

2. The method according to claim 1, wherein acquiring 3D-image data includes one of:
   generating the three-dimensional image representation of the patient's body part with an imaging modality, or acquiring the three-dimensional image representation of the patient's body part that was generated using an imaging modality,
wherein the imaging modality is selected from at least one of the following:
a CT imaging modality;
an MRI imaging modality; and
an ultrasound imaging modality.

3. The method according to claim 1, wherein the three-dimensional image representation is registered and supplemented with artificial image data which is retrieved from an anatomical atlas.

4. The method according to claim 1, wherein determining the reconstructed image data involves using the device which is movable relative to the patient's body part and has a device body that defines a device location and at least one device orientation, wherein
the location of the at least one two-dimensional reconstructed image relative to the three-dimensional image representation of the patient's body part is determined based on the device location relative to the patient's body part, wherein a position vector of an image plane of the at least one two-dimensional reconstructed image in a coordinate system assigned to the three-dimensional image representation is based on the device location; and/or wherein
at least one orientation of the at least one two-dimensional reconstructed image relative to the three-dimensional image representation of the patient's body part is determined based on the at least one device orientation relative to the patient's body part, wherein at least one direction vector of an image plane of the at least one two-dimensional reconstructed image in a coordinate system assigned to the three-dimensional image representation is based on the at least one device orientation; and/or wherein
at least one orientation of the at least one two-dimensional reconstructed image relative to the three-dimensional image representation of the patient's body part is determined based on at least one anatomical direction of the patient, a medial-lateral direction, a cranial-caudal direction and/or an anterior-posterior direction.

5. The method according to claim 1, wherein the object position data is acquired via
an external medical tracking system adapted to track the spatial position of the at least one object and of the augmented reality device within a static coordinate system, which is assigned to an operating theater; and/or
a tracking system which is adapted to track the spatial position of the at least one object, with respect to the spatial position of the augmented reality device and within a coordinate system coupled to the augmented reality device.

6. The method according to claim 1, wherein determining image augmentation data includes aligning the image location and/or the at least one image orientation of the at least one two-dimensional reconstructed image with the at least one object, such that the at least one two-dimensional reconstructed image:
is positioned at a predefined distance and/or in a predefined direction with respect to the at least one object, at a position in which the at least one two-dimensional reconstructed image and the at least one object do not occlude each other within the field of view; and/or
is positioned to show a representation of a structure which coincides with or which is offset by a predefined amount with respect to the corresponding actual structure within the field of view in a predefined direction, in a medial-lateral direction, a cranial-caudal direction and/or an anterior-posterior direction of the patient; and/or
has an image plane with at least one direction vector oriented dependent upon, oriented parallel or perpendicularly to an anatomical direction of the patient; and/or
has an image plane with at least one direction vector oriented dependent upon, oriented parallel or perpendicularly to a spatial direction of a static coordinate system, to a gravity vector or to a vertical direction and/or a horizontal direction of a coordinate system assigned to an operating theater; and/or
has an image plane with at least one direction vector oriented dependent upon, oriented parallel or perpendicularly to a spatial direction defined by a body of an instrument or a device body to a longitudinal axis of a medical instrument;
wherein the alignment is updated in accordance with the field of view provided by the augmented reality device.

7. The method according to claim 6, wherein the at least one two-dimensional reconstructed image is further positioned and/or oriented within the field of view depending on a line of sight assigned to the augmented reality device.

8. The method according to claim 7, wherein the image location and/or the at least one image orientation of the at least one two-dimensional reconstructed image is altered if an angle between the line of sight and an image plane of the at least one two-dimensional reconstructed image falls below a predefined value, wherein the at least one two-dimensional reconstructed image is rotated around a vertical and/or horizontal direction vector thereof by an amount of 90°.

9. The method according to claim 1, wherein at least one anatomical direction assigned to the patient's anatomy as shown in the at least one two-dimensional reconstructed image is parallel to the corresponding anatomical direction assigned to the patient's anatomy as seen in the field of view.

10. The method according to claim 1, wherein at least two reconstructed images are aligned with respect to each other within the field of view provided by the augmented reality device, wherein one or more pairs of reconstructed images are oriented with respect to each other such that an image plane of a first reconstructed image of the one or more pairs of reconstructed images has:
a direction vector which is parallel to a direction vector of the image plane of a second reconstructed image of the one or more pairs of reconstructed image and/or
a direction vector which is perpendicular to a direction vector of an image plane of a second reconstructed image of the one or more pairs of reconstructed images.

11. The method according to claim 1, wherein the at least one two-dimensional reconstructed image is confined to a virtual image frame having predefined or adjustable dimensions.

12. The method of claim 1, wherein determining the reconstructed image data is further based on the spatial position of the at least one object including the device or instrument with respect to the patient's body part.

13. The method of claim 12, wherein the at least one two-dimensional reconstructed image includes a trajectory of the device or instrument.

14. A non-transitory computer readable storage medium storing computer instructions which, when being executed by at least one processor, cause the at least one processor to perform a method comprising:

acquiring 3D-image data which describes at least one three-dimensional image representation of a patient's body part;

acquiring object position data which describes a spatial position of an augmented reality device and a spatial position of at least one object including a device or instrument present within a field of view of the augmented reality device with respect to the patient's body part;

determining reconstructed image data based on the 3D-image data, which describes at least one two-dimensional reconstructed image calculated from the three-dimensional image representation, wherein a location of the at least one two-dimensional reconstructed image relative to the three-dimensional image representation is determined based on the spatial position of the device or instrument relative to the patient's body part;

determining image augmentation data based on the reconstructed image data and the object position data, which describes the at least one two-dimensional reconstructed image displayed within the field of view provided by the augmented reality device, wherein an image location and/or at least one image orientation of the at least one displayed two-dimensional reconstructed image is defined with respect to the spatial position of the at least one object being selected from a group consisting of:

one or more sections of an at least temporarily static installation of an operating theatre, one or more sections of a medical device or instrument, and one or more sections of a patient's anatomy including one or more anatomical directions.

15. A system, comprising:

at least one processor to execute instructions stored on memory causing the at least one processor to:

acquire 3D-image data which describes at least one three-dimensional image representation of a patient's body part;

acquiring object position data which describes a spatial position of an augmented reality device and a spatial position of at least one object including a device or instrument present within a field of view of the augmented reality device with respect to the patient's body part;

determine reconstructed image data based on the 3D-image data, which describes at least one two-dimensional reconstructed image calculated from the three-dimensional image representation, wherein a location of the at least one two-dimensional reconstructed image relative to the three-dimensional image representation is determined based on the spatial position of the device or instrument relative to the patient's body part;

determine image augmentation data based on the reconstructed image data and the object position data, which describes the at least one two-dimensional reconstructed image displayed within the field of view provided by the augmented reality device, wherein an image location and/or at least one image orientation of the at least one displayed two-dimensional reconstructed image is defined with respect to the spatial position of the at least one object being selected from a group consisting of:

one or more sections of an at least temporarily static installation of an operating theatre, one or more sections of a medical device or instrument, one or more sections of a patient's anatomy including one or more anatomical directions;

at least one electronic data storage device storing at least the 3D-image data; and the augmented reality device, wherein the at least one processor is operably coupled to the at least one electronic data storage device for acquiring, from the at least one electronic data storage device, at least the 3D-image data, and the augmented reality device for issuing a control signal to the augmented reality device for controlling an operation of the augmented reality device on the basis of the image augmentation data.

* * * * *